(12) United States Patent
Gulati et al.

(10) Patent No.: US 11,754,669 B2
(45) Date of Patent: Sep. 12, 2023

(54) RADAR COORDINATION FOR MULTI-RADAR COEXISTENCE

(71) Applicant: QUALCOMM Incorporated, San Diego, CA (US)

(72) Inventors: Kapil Gulati, Belle Mead, NJ (US); Khurram Usman Mazher, Austin, TX (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 165 days.

(21) Appl. No.: 17/037,288

(22) Filed: Sep. 29, 2020

(65) Prior Publication Data
US 2021/0096234 A1 Apr. 1, 2021

Related U.S. Application Data

(60) Provisional application No. 62/908,356, filed on Sep. 30, 2019.

(51) Int. Cl.
*G01S 7/02* (2006.01)
*G01S 13/28* (2006.01)
(Continued)

(52) U.S. Cl.
CPC ............ *G01S 7/0234* (2021.05); *G01S 7/292* (2013.01); *G01S 13/288* (2013.01);
(Continued)

(58) Field of Classification Search
CPC ...... G01S 7/023; G01S 7/0234; G01S 7/0233; G01S 13/288; G01S 13/346; G01S 13/36;
(Continued)

(56) References Cited

U.S. PATENT DOCUMENTS 3,008,136 A * 11/1961 Mccoy ................... G05D 3/121
                                                          318/280
3,818,477 A * 6/1974 Odams ..................... H03L 7/06
                                                          342/396
(Continued)

FOREIGN PATENT DOCUMENTS

CN        110877609 A   *   3/2020   ............. G01S 17/34

OTHER PUBLICATIONS

Group delay engineering using cascaded all pass filters for wideband chirp waveform generation by Sumanta Bose published IEEE (Year: 2013).*

(Continued)

*Primary Examiner* — Vladimir Magloire
*Assistant Examiner* — Michael W Justice
(74) *Attorney, Agent, or Firm* — QUALCOMM Incorporated

(57) ABSTRACT

Disclosed are techniques for transmitting and receiving a plurality of encoded information bits on a radar signal. In an aspect, a transmitter radar generates a first set of modulated phase-coded symbols to convey the plurality of encoded information bits, generates a second set of modulated phase-coded symbols as reference symbols having a known phase modulation, phase codes a plurality of chirps of the radar signal according to the first and second sets of modulated phase-coded symbols, and transmits the plurality of chirps according to the phase coding. A receiver radar determines a phase difference between the receiver and transmitter radars based on a phase of the plurality of chirps, equalizes the phase based on the determined phase difference, determines a phase code of the first set of symbols based on the equalized phase, and decodes the encoded information bits based on the phase code of the first set of symbols.

19 Claims, 13 Drawing Sheets

(51) Int. Cl.
*G01S 13/32* (2006.01)
*G01S 13/931* (2020.01)
*G01S 7/292* (2006.01)
*G01S 13/58* (2006.01)

(52) U.S. Cl.
CPC .......... *G01S 13/325* (2013.01); *G01S 13/584* (2013.01); *G01S 13/931* (2013.01)

(58) Field of Classification Search
CPC .... G01S 13/343; G01S 13/345; G01S 13/325; G01S 13/931
USPC .................................................. 342/201, 372
See application file for complete search history.

(56) References Cited

U.S. PATENT DOCUMENTS

| | | | | |
|---|---|---|---|---|
| 4,430,148 | A * | 2/1984 | Schaefer | B29C 66/83511 156/580.2 |
| 4,968,968 | A * | 11/1990 | Taylor | G01S 7/4008 342/174 |
| 5,334,982 | A * | 8/1994 | Owen | G01S 13/765 342/36 |
| 5,847,661 | A * | 12/1998 | Ricci | G08G 1/096716 340/447 |
| 5,892,477 | A * | 4/1999 | Wehling | G01S 7/36 342/18 |
| 6,144,332 | A * | 11/2000 | Reindl | G06K 19/0675 342/42 |
| 6,157,321 | A * | 12/2000 | Ricci | G08G 1/163 340/928 |
| 6,405,147 | B1 * | 6/2002 | Fera | H04B 1/62 702/182 |
| 6,686,871 | B2 * | 2/2004 | Rohling | G01S 13/524 342/127 |
| 7,430,257 | B1 * | 9/2008 | Shattil | H04B 1/707 375/349 |
| 8,848,844 | B2 * | 9/2014 | Hyll | H04L 25/0206 375/343 |
| 9,116,237 | B2 * | 8/2015 | Zhou | G01S 13/84 |
| 9,258,161 | B2 * | 2/2016 | Jalloul | H04L 27/2613 |
| 9,444,514 | B2 * | 9/2016 | Hadani | H04L 25/0212 |
| 9,668,148 | B2 * | 5/2017 | Hadani | H04L 5/0023 |
| 9,867,065 | B2 * | 1/2018 | Hadani | H04B 7/0626 |
| 10,034,184 | B2 * | 7/2018 | Hadani | H04L 25/022 |
| 10,048,353 | B2 * | 8/2018 | Vogt | G01S 13/325 |
| 10,097,287 | B1 * | 10/2018 | Schat | G01S 7/354 |
| 10,126,418 | B1 * | 11/2018 | Campbell | G01S 13/931 |
| 10,291,436 | B2 * | 5/2019 | Dutz | H04L 1/0059 |
| 10,389,568 | B1 * | 8/2019 | Shattil | H04J 13/0003 |
| 10,401,495 | B2 * | 9/2019 | Crouch | G01S 17/26 |
| 10,530,529 | B2 * | 1/2020 | Küchler | H04L 1/0071 |
| 10,641,882 | B2 * | 5/2020 | Kishigami | G01S 13/106 |
| 10,681,568 | B1 * | 6/2020 | Hadani | H04W 24/02 |
| 10,684,352 | B2 * | 6/2020 | El Assaad | G08G 1/22 |
| 10,778,492 | B1 * | 9/2020 | Shattil | H04L 27/2614 |
| 10,827,528 | B2 * | 11/2020 | Mukherjee | H04L 5/0048 |
| 11,002,843 | B2 * | 5/2021 | Akamine | G01S 13/87 |
| 11,025,468 | B1 * | 6/2021 | Shattil | H04J 13/12 |
| 11,041,954 | B2 * | 6/2021 | Crouch | G01S 17/89 |
| 11,054,516 | B2 * | 7/2021 | Wu | G01S 7/354 |
| 2003/0156057 | A1 * | 8/2003 | Rohling | G01S 7/288 342/131 |
| 2010/0098042 | A1 * | 4/2010 | Dent | H04J 13/004 370/347 |
| 2010/0311354 | A1 * | 12/2010 | Stayton | G08G 5/0008 455/90.1 |
| 2013/0170590 | A1 * | 7/2013 | Hyll | H04L 27/2686 375/343 |
| 2014/0184447 | A1 * | 7/2014 | Zhou | G01S 13/84 342/127 |
| 2015/0063321 | A1 * | 3/2015 | Sadek | H04L 5/0062 370/336 |
| 2015/0117395 | A1 * | 4/2015 | Hadani | H04W 24/02 370/330 |
| 2016/0124075 | A1 * | 5/2016 | Vogt | G01S 13/536 342/13 |
| 2016/0381576 | A1 * | 12/2016 | Hadani | H04L 27/366 370/330 |
| 2017/0276784 | A1 * | 9/2017 | Manku | G01S 13/74 |
| 2017/0303146 | A1 * | 10/2017 | Hadani | H04L 27/2639 |
| 2018/0242170 | A1 * | 8/2018 | Hadani | H04L 27/366 |
| 2018/0254925 | A1 * | 9/2018 | Dutz | H04B 1/7183 |
| 2018/0259632 | A1 * | 9/2018 | Kishigami | G01S 7/2921 |
| 2019/0011558 | A1 * | 1/2019 | Crouch | G01S 7/4866 |
| 2019/0074930 | A1 * | 3/2019 | Küchler | G01S 11/08 |
| 2019/0148829 | A1 * | 5/2019 | Ananth | H04B 17/21 342/174 |
| 2019/0195982 | A1 * | 6/2019 | El Assaad | G01S 19/03 |
| 2019/0212430 | A1 * | 7/2019 | Akamine | G01S 13/87 |
| 2019/0219683 | A1 * | 7/2019 | Fang | G01S 7/35 |
| 2019/0271776 | A1 * | 9/2019 | Davis | G01S 13/931 |
| 2019/0310358 | A1 * | 10/2019 | Lee | G01S 13/42 |
| 2019/0310359 | A1 * | 10/2019 | Lee | G01S 13/86 |
| 2019/0327765 | A1 * | 10/2019 | Mukherjee | H04W 16/14 |
| 2019/0339388 | A1 * | 11/2019 | Crouch | G01S 17/89 |
| 2019/0361122 | A1 * | 11/2019 | Crouch | G01S 7/487 |
| 2020/0081110 | A1 * | 3/2020 | Nam | G01S 13/42 |
| 2020/0103517 | A1 | 4/2020 | Kim | |
| 2020/0158861 | A1 | 5/2020 | Cattle et al. | |
| 2020/0166647 | A1 | 5/2020 | Crouch et al. | |
| 2020/0191939 | A1 * | 6/2020 | Wu | G01S 7/354 |
| 2020/0305010 | A1 * | 9/2020 | Hadani | H04L 25/022 |
| 2021/0003701 | A1 * | 1/2021 | Sturm | G01S 13/93 |
| 2021/0055374 | A1 * | 2/2021 | Dokhanchi | G01S 7/006 |
| 2021/0278536 | A1 * | 9/2021 | Crouch | H04B 10/516 |

OTHER PUBLICATIONS

Group Delay Compensation Power Amplifier with Auto Power Level Control for 24 GHz FMCW Automobile Radar Application by Dong Chen at University of Electronic Science and Technology of China published IEEE (Year: 2018).*
International Search Report and Written Opinion—PCT/US2020/053555—ISA/EPO—dated Jan. 14, 2021.
Poulli N D., "Passive Detection Using Digital Broadcasters (DAB, DVB) with COFDM Modulation—Passive Radar Systems", IEE Proceedings: RADAR, Sonar & Navigation, Institution of Electrical Engineers, GB, vol. 152, No. 3, Jun. 3, 2005 (Jun. 3, 2005), pp. 143-152, XP006024042, ISSN: 1350-2395, DOI: 10.1049/IP-RSN:20045017, p. 143, Left-hand column, line 1-p. 145, Right-Hand column, line 8.

* cited by examiner

RADAR COORDINATION FOR MULTI-RADAR COEXISTENCE

CROSS-REFERENCE TO RELATED APPLICATIONS

The present application for patent claims the benefit of U.S. Provisional Application No. 62/908,356, entitled "RADAR COORDINATION FOR MULTI-RADAR COEXISTENCE," filed Sep. 30, 2019, assigned to the assignee hereof, and expressly incorporated herein by reference in its entirety.

1. TECHNICAL FIELD

Aspects of this disclosure relate generally to autonomous or semi-autonomous driving techniques.

2. BACKGROUND

Modern motor vehicles are increasingly incorporating technology that helps drivers avoid drifting into adjacent lanes or making unsafe lane changes (e.g., lane departure warning (LDW)), or that warns drivers of other vehicles behind them when they are backing up, or that brakes automatically if a vehicle ahead of them stops or slows suddenly (e.g., forward collision warning (FCW)), among other things. The continuing evolution of automotive technology aims to deliver even greater safety benefits, and ultimately deliver automated driving systems (ADS) that can handle the entire task of driving without the need for user intervention.

There are six levels that have been defined to achieve full automation. At Level 0, the human driver does all the driving. At Level 1, an advanced driver assistance system (ADAS) on the vehicle can sometimes assist the human driver with either steering or braking/accelerating, but not both simultaneously. At Level 2, an ADAS on the vehicle can itself actually control both steering and braking/accelerating simultaneously under some circumstances. The human driver must continue to pay full attention at all times and perform the remainder of the driving tasks. At Level 3, an ADS on the vehicle can itself perform all aspects of the driving task under some circumstances. In those circumstances, the human driver must be ready to take back control at any time when the ADS requests the human driver to do so. In all other circumstances, the human driver performs the driving task. At Level 4, an ADS on the vehicle can itself perform all driving tasks and monitor the driving environment, essentially doing all of the driving, in certain circumstances. The human need not pay attention in those circumstances. At Level 5, an ADS on the vehicle can do all the driving in all circumstances. The human occupants are just passengers and need never be involved in driving.

SUMMARY

The following presents a simplified summary relating to one or more aspects disclosed herein. As such, the following summary should not be considered an extensive overview relating to all contemplated aspects, nor should the following summary be regarded to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of transmitting a plurality of encoded information bits on a radar signal performed by a transmitter radar includes generating a first set of phase-shift keying (PSK) modulated phase-coded symbols to convey the plurality of encoded information bits; generating a second set of PSK modulated phase-coded symbols as reference symbols having a known phase modulation; phase coding a plurality of chirps of the radar signal according to the first set of PSK modulated phase-coded symbols and the second set of PSK modulated phase-coded symbols; and transmitting the plurality of chirps of the radar signal according to the phase coding.

In an aspect, a method of receiving a plurality of encoded information bits on a radar signal performed by a receiver radar includes receiving, from a transmitter radar, a plurality of chirps of the radar signal, wherein the plurality of chirps of the radar signal are phase coded according to a first set of PSK modulated phase-coded symbols and a second set of PSK modulated phase-coded symbols, wherein the first set of PSK modulated phase-coded symbols convey the plurality of encoded information bits, and wherein the second set of PSK modulated phase-coded symbols are reference symbols having a known phase modulation; determining a phase difference between the receiver radar and the transmitter radar based on a phase of the plurality of chirps of the radar signal phase coded according to the second set of PSK modulated phase-coded symbols; equalizing the phase of the plurality of chirps of the radar signal based on the determined phase difference; determining a phase code of the first set of PSK modulated phase-coded symbols based on the equalized phase of the plurality of chirps; and decoding the plurality of encoded information bits based on the phase code of the first set of PSK modulated phase-coded symbols.

In an aspect, an apparatus includes a transmitter radar configured to: generate a first set of PSK modulated phase-coded symbols to convey a plurality of encoded information bits; generate a second set of PSK modulated phase-coded symbols as reference symbols having a known phase modulation; phase code a plurality of chirps of a radar signal according to the first set of PSK modulated phase-coded symbols and the second set of PSK modulated phase-coded symbols; and transmit the plurality of chirps of the radar signal according to the phase coding.

In an aspect, an apparatus includes a receiver radar configured to: receive, from a transmitter radar, a plurality of chirps of a radar signal, wherein the plurality of chirps of the radar signal are phase coded according to a first set of PSK modulated phase-coded symbols and a second set of PSK modulated phase-coded symbols, wherein the first set of PSK modulated phase-coded symbols convey a plurality of encoded information bits, and wherein the second set of PSK modulated phase-coded symbols are reference symbols having a known phase modulation; determine a phase difference between the receiver radar and the transmitter radar based on a phase of the plurality of chirps of the radar signal phase coded according to the second set of PSK modulated phase-coded symbols; equalize the phase of the plurality of chirps of the radar signal based on the determined phase difference; determine a phase code of the first set of PSK modulated phase-coded symbols based on the equalized phase of the plurality of chirps; and decode the plurality of encoded information bits based on the phase code of the first set of PSK modulated phase-coded symbols.

In an aspect, an apparatus includes means for generating a first set of PSK modulated phase-coded symbols to convey a plurality of encoded information bits; means for generating a second set of PSK modulated phase-coded symbols as reference symbols having a known phase modulation; means for phase coding a plurality of chirps of a radar signal according to the first set of PSK modulated phase-coded symbols and the second set of PSK modulated phase-coded symbols; and means for transmitting the plurality of chirps of the radar signal according to the phase coding.

In an aspect, an apparatus includes means for receiving, from a transmitter radar, a plurality of chirps of a radar signal, wherein the plurality of chirps of the radar signal are phase coded according to a first set of PSK modulated phase-coded symbols and a second set of PSK modulated phase-coded symbols, wherein the first set of PSK modulated phase-coded symbols convey a plurality of encoded information bits, and wherein the second set of PSK modulated phase-coded symbols are reference symbols having a known phase modulation; means for determining a phase difference between the receiver radar and the transmitter radar based on a phase of the plurality of chirps of the radar signal phase coded according to the second set of PSK modulated phase-coded symbols; means for equalizing the phase of the plurality of chirps of the radar signal based on the determined phase difference; means for determining a phase code of the first set of PSK modulated phase-coded symbols based on the equalized phase of the plurality of chirps; and means for decoding the plurality of encoded information bits based on the phase code of the first set of PSK modulated phase-coded symbols.

In an aspect, a non-transitory computer-readable medium storing computer-executable instructions, the computer-executable instructions comprising at least one instruction instructing a transmitter radar to generate a first set of PSK modulated phase-coded symbols to convey the plurality of encoded information bits; at least one instruction instructing the transmitter radar to generate a second set of PSK modulated phase-coded symbols as reference symbols having a known phase modulation; at least one instruction instructing the transmitter radar to phase code a plurality of chirps of a radar signal according to the first set of PSK modulated phase-coded symbols and the second set of PSK modulated phase-coded symbols; and at least one instruction instructing the transmitter radar to transmit the plurality of chirps of the radar signal according to the phase coding.

In an aspect, a non-transitory computer-readable medium storing computer-executable instructions, the computer-executable instructions comprising at least one instruction instructing a receiver radar to receive, from a transmitter radar, a plurality of chirps of a radar signal, wherein the plurality of chirps of the radar signal are phase coded according to a first set of PSK modulated phase-coded symbols and a second set of PSK modulated phase-coded symbols, wherein the first set of PSK modulated phase-coded symbols convey a plurality of encoded information bits, and wherein the second set of PSK modulated phase-coded symbols are reference symbols having a known phase modulation; at least one instruction instructing the receiver radar to determine a phase difference between the receiver radar and the transmitter radar based on a phase of the plurality of chirps of the radar signal phase coded according to the second set of PSK modulated phase-coded symbols; at least one instruction instructing the receiver radar to equalize the phase of the plurality of chirps of the radar signal based on the determined phase difference; at least one instruction instructing the receiver radar to determine a phase code of the first set of PSK modulated phase-coded symbols based on the equalized phase of the plurality of chirps; and at least one instruction instructing the receiver radar to decode the plurality of encoded information bits based on the phase code of the first set of PSK modulated phase-coded symbols.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
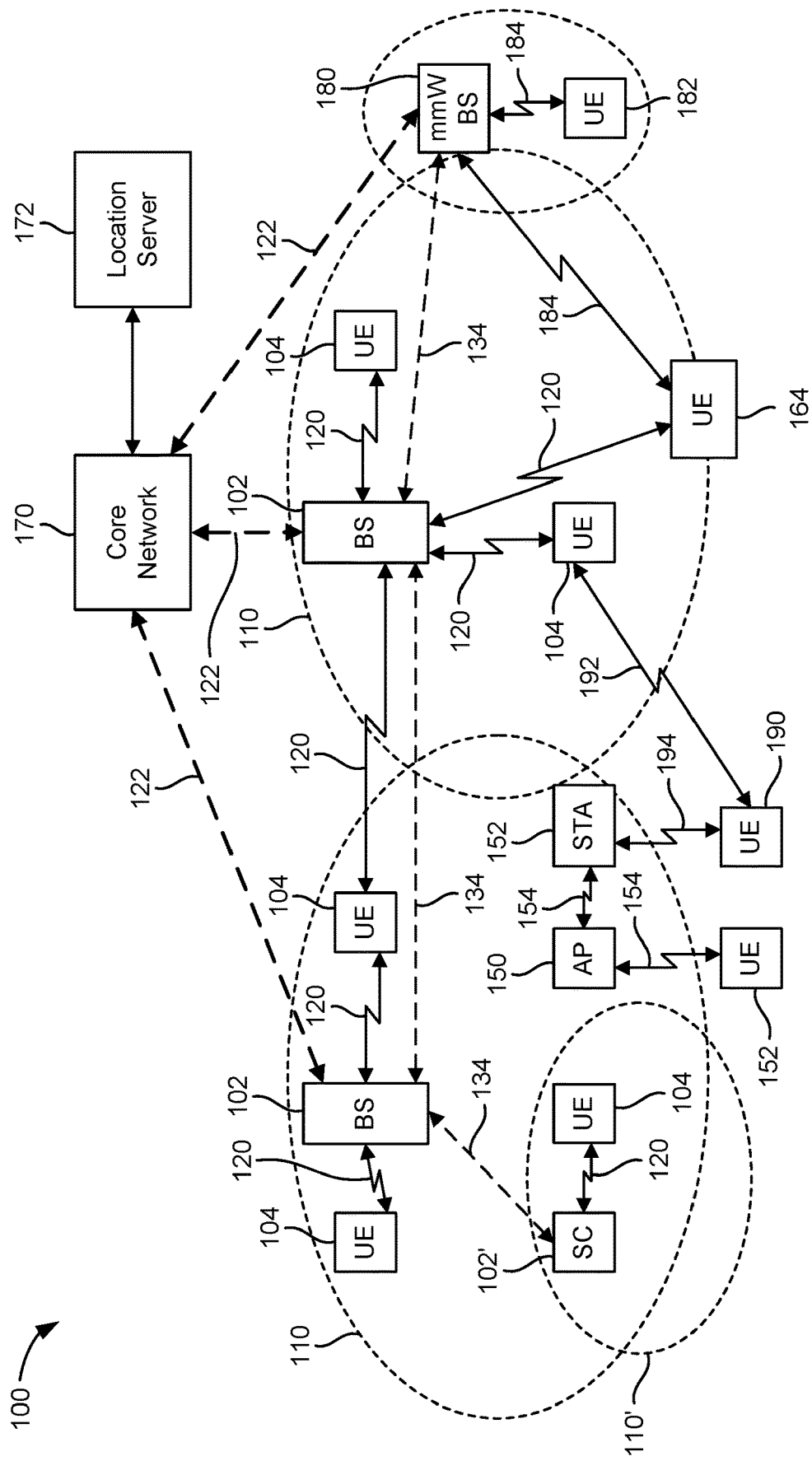
FIG. 1 is a diagram illustrating an example of a wireless communications system and an access network, according to various aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on the 802.11 standard from the Institute of Electrical and Electronics Engineers (IEEE), etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna or antenna array of the base station corresponding to a cell (or several cell sectors) of the base station. Where the term "base station" refers to multiple co-located physical TRPs, each of the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas or antenna arrays connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals (or simply "reference signals") the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

According to various aspects, FIG. 1 illustrates an example wireless communications system 100. The wireless communications system 100 (which may also be referred to as a wireless wide area network (WWAN)) may include various base stations 102 and various UEs 104. The base stations 102 may include macro cell base stations (high power cellular base stations) and/or small cell base stations (low power cellular base stations). In an aspect, the macro cell base station may include eNBs and/or ng-eNBs where the wireless communications system 100 corresponds to a Long-Term Evolution (LTE) network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (which may be part of core network 170 or may be external to core network 170). In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while canceling to suppress radiation in undesired directions.

Transmit beams may be quasi-co-located, meaning that they appear to the receiver (e.g., a UE) as having the same parameters, regardless of whether or not the transmitting antennas of the network node themselves are physically co-located. In NR, there are four types of quasi-collocation (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Receive beams may be spatially related. A spatial relation means that parameters for a transmit beam for a second reference signal can be derived from information about a receive beam for a first reference signal. For example, a UE may use a particular receive beam to receive one or more reference downlink reference signals (e.g., positioning reference signals (PRS), tracking reference signals (TRS), phase tracking reference signal (PTRS), cell-specific reference signals (CRS), channel state information reference signals (CSI-RS), primary synchronization signals (PSS), secondary synchronization signals (SSS), synchronization signal blocks (SSBs), etc.) from a base station. The UE can then form a transmit beam for sending one or more uplink reference signals (e.g., uplink positioning reference signals (UL-PRS), sounding reference signal (SRS), demodulation reference signals (DMRS), PTRS, etc.) to that base station based on the parameters of the receive beam.

Note that a "downlink" beam may be either a transmit beam or a receive beam, depending on the entity forming it. For example, if a base station is forming a downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

Figure 2A:
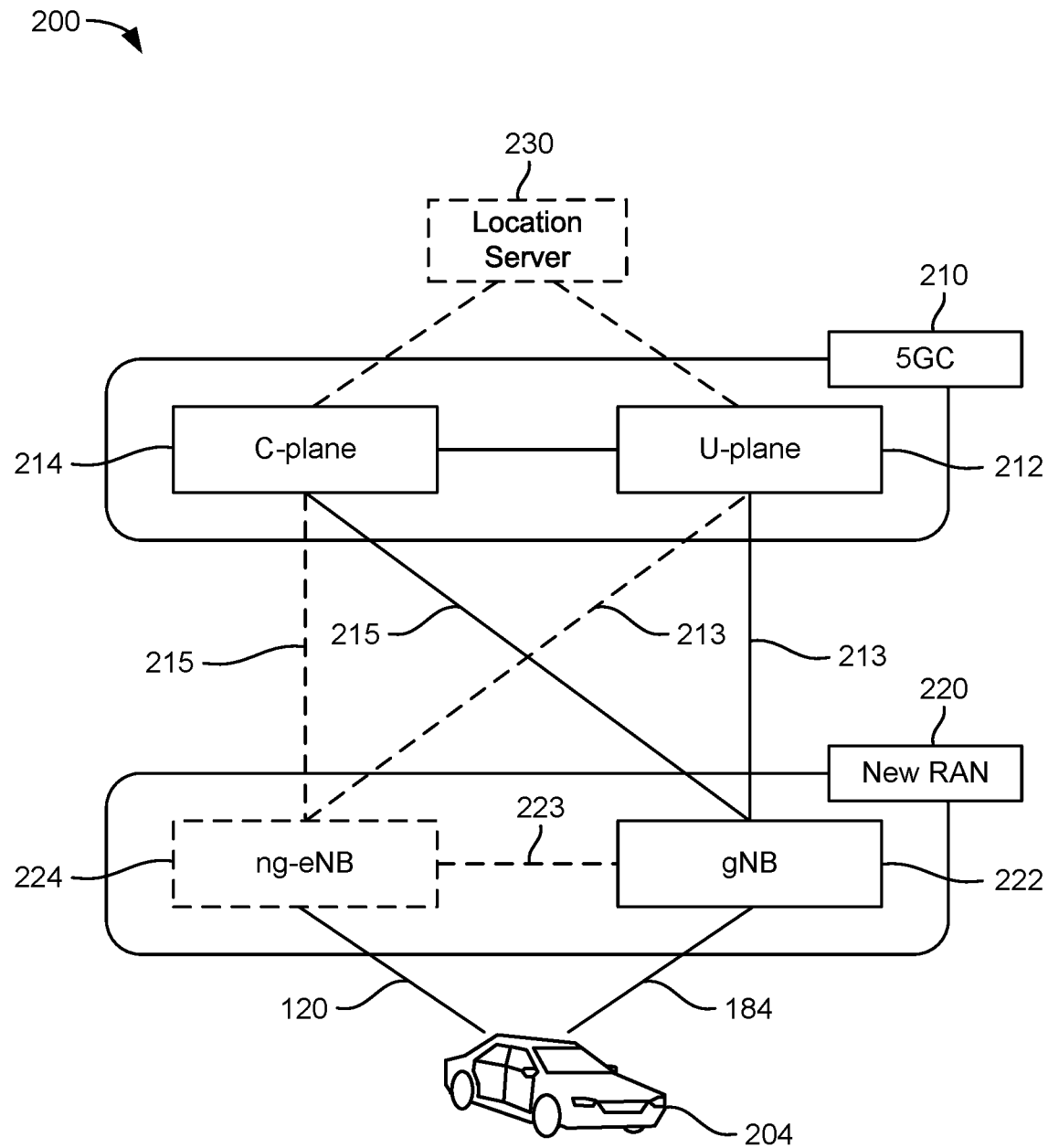
FIGS. 2A and 2B illustrate example wireless network structures, according to various aspects of the disclosure.

According to various aspects, FIG. 2A illustrates an example wireless network structure 200. For example, a 5GC 210 (also referred to as a Next Generation Core (NGC)) can be viewed functionally as control plane functions 214 (e.g., UE registration, authentication, network access, gateway selection, etc.) and user plane functions 212, (e.g., UE gateway function, access to data networks, Internet protocol (IP) routing, etc.) which operate cooperatively to form the core network. User plane interface (NG-U) 213 and control plane interface (NG-C) 215 connect the gNB 222 to the 5GC 210 and specifically to the control plane functions 214 and user plane functions 212. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, the New RAN 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1). Another optional aspect may include location server 230, which may be in communication with the 5GC 210 to provide location assistance for UEs 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network.

Figure 2B:
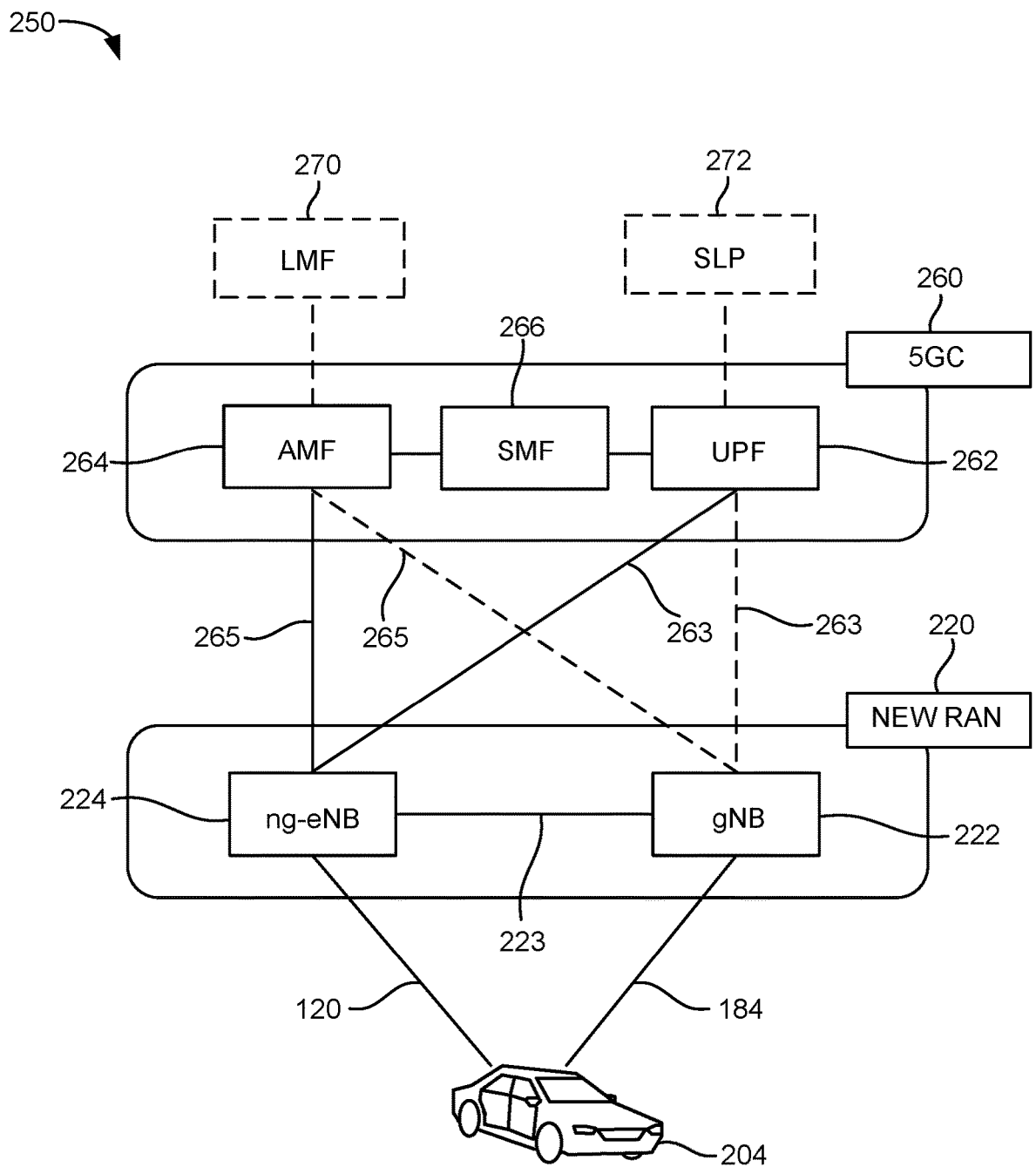

According to various aspects, FIG. 2B illustrates another example wireless network structure 250. For example, a 5GC 260 can be viewed functionally as control plane functions, provided by an access and mobility management function (AMF) 264, and user plane functions, provided by a user plane function (UPF) 262, which operate cooperatively to form the core network (i.e., 5GC 260). User plane interface 263 and control plane interface 265 connect the ng-eNB 224 to the 5GC 260 and specifically to UPF 262 and AMF 264, respectively. In an additional configuration, a gNB 222 may also be connected to the 5GC 260 via control plane interface 265 to AMF 264 and user plane interface 263 to UPF 262. Further, ng-eNB 224 may directly communicate with gNB 222 via the backhaul connection 223, with or without gNB direct connectivity to the 5GC 260. In some configurations, the New RAN 220 may only have one or more gNBs 222, while other configurations include one or more of both ng-eNBs 224 and gNBs 222. Either gNB 222 or ng-eNB 224 may communicate with a UE 204 (e.g., any of the UEs depicted in FIG. 1), which, in the example of FIG. 2B, is an autonomous or semi-autonomous vehicle. The base stations of the New RAN 220 communicate with the AMF 264 over the N2 interface and with the UPF 262 over the N3 interface.

The functions of the AMF 264 include registration management, connection management, reachability management, mobility management, lawful interception, transport for session management (SM) messages between the UE 204 and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives an intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the New RAN 220 and the LMF 270, evolved packet system (EPS) bearer identifier allocation for interworking with the EPS, and UE 204 mobility event notification. In addition, the AMF 264 also supports functionalities for non-Third Generation Partnership Project (3GPP) access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as a secure user plane location (SUPL) location platform (SLP) 272.

The functions of the SMF 266 include session management, UE (IP address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, New RAN 220, and UEs 204 over a control plane (e.g., using interfaces and protocols intended to convey signaling messages and not voice or data), the SLP 272 may communicate with UEs 204 and external clients (not shown in FIG. 2B) over a user plane (e.g., using protocols intended to carry voice and/or data like the transmission control protocol (TCP) and/or IP).

In an aspect, the LMF 270 and/or the SLP 272 may be integrated into a base station, such as the gNB 222 and/or the ng-eNB 224. When integrated into the gNB 222 and/or the ng-eNB 224, the LMF 270 and/or the SLP 272 may be referred to as a "location management component," or "LMC." However, as used herein, references to the LMF 270 and the SLP 272 include both the case in which the LMF 270 and the SLP 272 are components of the core network (e.g., 5GC 260) and the case in which the LMF 270 and the SLP 272 are components of a base station.

Autonomous and semi-autonomous driving safety technologies use a combination of hardware (sensors, cameras, and radar) and software to help vehicles identify certain safety risks so they can warn the driver to act (in the case of an ADAS), or act themselves (in the case of an ADS), to avoid a crash. A vehicle outfitted with an ADAS or ADS includes one or more camera sensors mounted on the vehicle that capture images of the scene in front of the vehicle, and also possibly behind and to the sides of the vehicle. Radar systems may also be used to detect objects along the road of travel, and also possibly behind and to the sides of the vehicle. Radar systems utilize RF waves to determine the range, direction, speed, and/or altitude of the objects along the road. More specifically, a transmitter transmits pulses of RF waves that bounce off any object(s) in their path. The pulses reflected off the object(s) return a small part of the RF waves' energy to a receiver, which is typically located at the same location as the transmitter. The camera and radar are typically oriented to capture their respective versions of the same scene.

A processor, such as a digital signal processor (DSP), within the vehicle analyzes the captured camera images and radar frames and attempts to identify objects within the captured scene. Such objects may be other vehicles, pedestrians, road signs, objects within the road of travel, etc. The radar system provides reasonably accurate measurements of object distance and velocity in various weather conditions. However, radar systems typically have insufficient resolution to identify features of the detected objects. Camera sensors, however, typically do provide sufficient resolution to identify object features. The cues of object shapes and appearances extracted from the captured images may provide sufficient characteristics for classification of different objects. Given the complementary properties of the two sensors, data from the two sensors can be combined (referred to as "fusion") in a single system for improved performance.

To further enhance ADAS and ADS systems, especially at Level 3 and beyond, autonomous and semi-autonomous vehicles may utilize high definition (HD) map datasets, which contain significantly more detailed information and true-ground-absolute accuracy than those found in current conventional resources. Such HD maps may provide accuracy in the 7-10 cm absolute ranges, highly detailed inventories of all stationary physical assets related to roadways, such as road lanes, road edges, shoulders, dividers, traffic signals, signage, paint markings, poles, and other data useful for the safe navigation of roadways and intersections by autonomous/semi-autonomous vehicles. HD maps may also provide electronic horizon predictive awareness, which enables autonomous/semi-autonomous vehicles to know what lies ahead.

Figure 3:
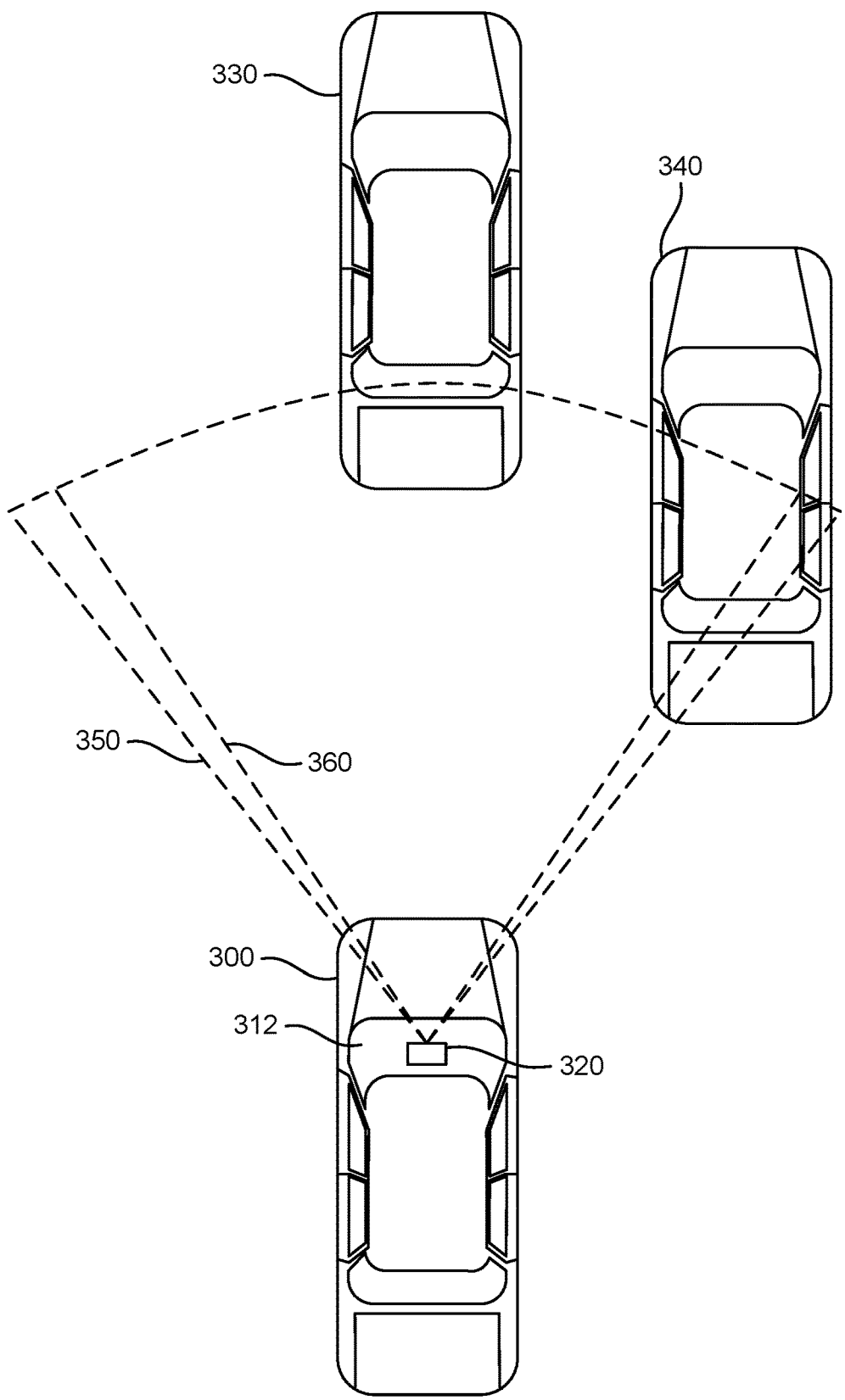
FIG. 3 is a top view of a vehicle employing an integrated radar-camera sensor behind the windshield, according to various aspects of the disclosure.

Referring now to FIG. 3, a vehicle 300 (referred to as an "ego vehicle" or a "host vehicle") is illustrated that includes a radar-camera sensor module 320 located in the interior compartment of the vehicle 300 behind the windshield 312. The radar-camera sensor module 320 includes a radar component configured to transmit radar signals through the windshield 312 in a horizontal coverage zone 350 (shown by dashed lines), and receive reflected radar signals that are reflected off of any objects within the coverage zone 350. The radar-camera sensor module 320 further includes a camera component for capturing images based on light waves that are seen and captured through the windshield 312 in a horizontal coverage zone 360 (shown by dashed lines).

Although FIG. 3 illustrates an example in which the radar component and the camera component are co-located components in a shared housing, as will be appreciated, they may be separately housed in different locations within the vehicle 300. For example, the camera may be located as shown in FIG. 3, and the radar component may be located in the grill or front bumper of the vehicle 300. Additionally, although FIG. 3 illustrates the radar-camera sensor module 320 located behind the windshield 312, it may instead be located in a rooftop sensor array, or elsewhere. Further, although FIG. 3 illustrates only a single radar-camera sensor module 320, as will be appreciated, the vehicle 300 may have multiple radar-camera sensor modules 320 pointed in different directions (to the sides, the front, the rear, etc.). The various radar-camera sensor modules 320 may be under the "skin" of the vehicle (e.g., behind the windshield 312, door panels, bumpers, grills, etc.) or within a rooftop sensor array.

The radar-camera sensor module 320 may detect one or more (or none) objects relative to the vehicle 300. In the example of FIG. 3, there are two objects, vehicles 330 and 340, within the horizontal coverage zones 350 and 360 that the radar-camera sensor module 320 can detect. The radar-camera sensor module 320 may estimate parameters (attributes) of the detected object(s), such as the position, range, direction, speed, size, classification (e.g., vehicle, pedestrian, road sign, etc.), and the like. The radar-camera sensor module 320 may be employed onboard the vehicle 300 for automotive safety applications, such as adaptive cruise control (ACC), forward collision warning (FCW), collision mitigation or avoidance via autonomous braking, lane departure warning (LDW), and the like.

Collocating the camera and radar permits these components to share electronics and signal processing, and in particular, enables early radar-camera data fusion. For example, the radar and camera may be integrated onto a single board. A joint radar-camera alignment technique may be employed to align both the radar and the camera. However, collocation of the radar and camera is not required to practice the techniques described herein.

Figure 4:
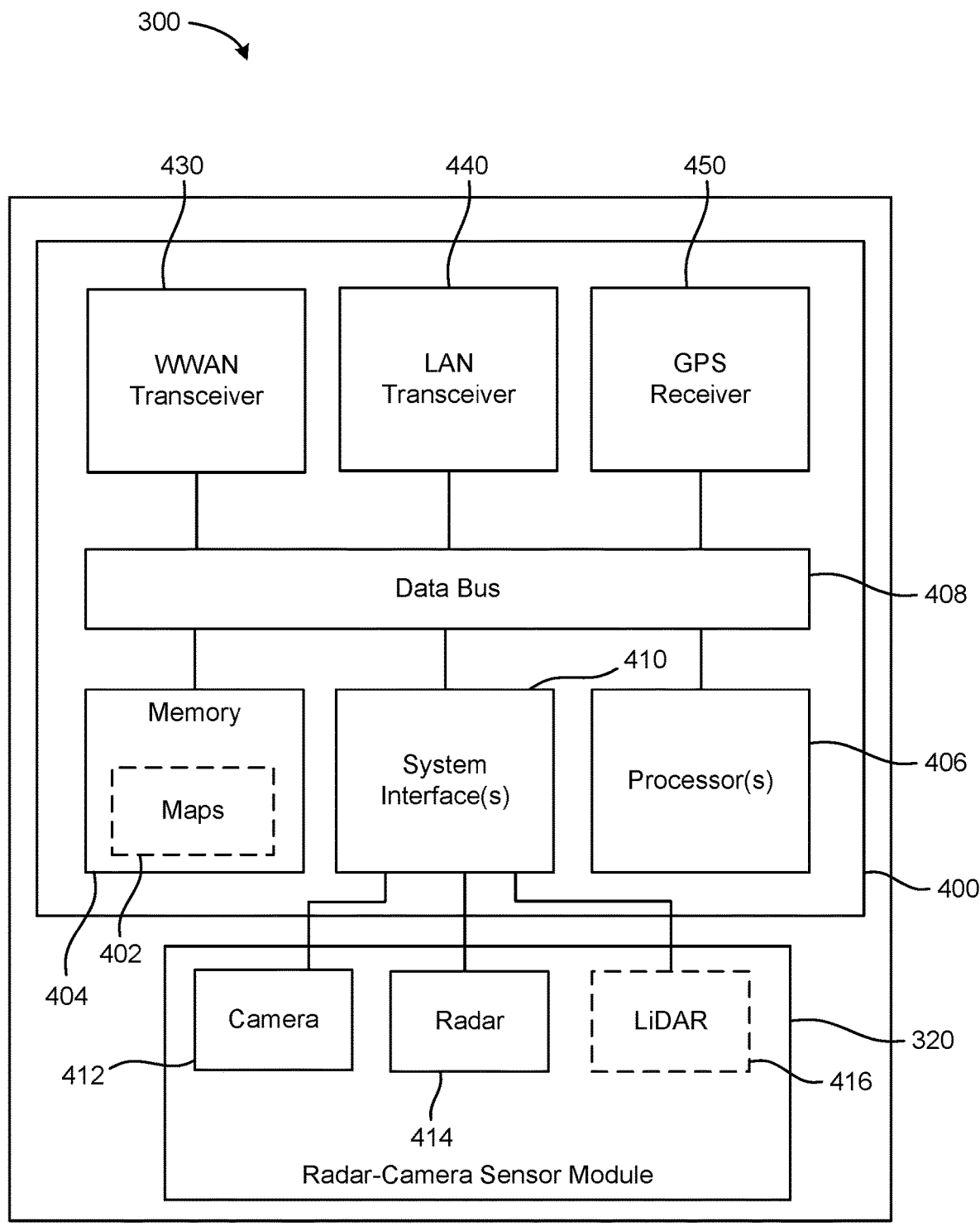
FIG. 4 illustrates an on-board computer architecture, according to various aspects of the disclosure.

FIG. 4 illustrates an on-board computer (OBC) 400 of a vehicle 300, according to various aspects of the disclosure. In an aspect, the OBC 400 may be part of an ADAS or ADS. The OBC 400 includes a non-transitory computer-readable storage medium, i.e., memory 404, and one or more processors 406 in communication with the memory 404 via a data bus 408. The memory 404 includes one or more storage modules storing computer-readable instructions executable by the processor(s) 406 to perform the functions of the OBC 400 described herein. For example, the processor(s) 406 in conjunction with the memory 404 may implement the various operations described herein.

One or more radar-camera sensor modules 320 are coupled to the OBC 400 (only one is shown in FIG. 4 for simplicity). In some aspects, the radar-camera sensor module 320 includes at least one camera 412, at least one radar 414, and an optional light detection and ranging (LiDAR) sensor 416. The OBC 400 also includes one or more system interfaces 410 connecting the processor(s) 406, by way of the data bus 408, to the radar-camera sensor module 320 and, optionally, other vehicle sub-systems (not shown).

The OBC 400 also includes, at least in some cases, a wireless wide area network (WWAN) transceiver 430 configured to communicate via one or more wireless communication networks (not shown), such as an NR network, an LTE network, a Global System for Mobile communication (GSM) network, and/or the like. The WWAN transceiver 430 may be connected to one or more antennas (not shown) for communicating with other network nodes, such as other vehicle UEs, pedestrian UEs, infrastructure access points, roadside units (RSUs), base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceiver 430 may be variously configured for transmitting and encoding signals (e.g., messages, indications, information, and so on), and, conversely, for receiving and decoding signals (e.g., messages, indications, information, pilots, and so on) in accordance with the designated RAT.

The OBC 400 also includes, at least in some cases, a wireless local area network (WLAN) transceiver 440. The WLAN transceiver 440 may be connected to one or more antennas (not shown) for communicating with other network nodes, such as other vehicle UEs, pedestrian UEs, infrastructure access points, RSUs, etc., via at least one designated RAT (e.g., cellular vehicle-to-everything (C-V2X), IEEE 802.11p (also known as wireless access for vehicular environments (WAVE)), dedicated short-range communication (DSRC), etc.) over a wireless communication medium of interest. The WLAN transceiver 440 may be variously configured for transmitting and encoding signals (e.g., messages, indications, information, and so on), and, conversely, for receiving and decoding signals (e.g., messages, indications, information, pilots, and so on) in accordance with the designated RAT.

As used herein, a "transceiver" may include a transmitter circuit, a receiver circuit, or a combination thereof, but need not provide both transmit and receive functionalities in all designs. For example, a low functionality receiver circuit may be employed in some designs to reduce costs when providing full communication is not necessary (e.g., a receiver chip or similar circuitry simply providing low-level sniffing).

The OBC 400 also includes, at least in some cases, a global positioning systems (GPS) receiver 450. The GPS receiver 450 may be connected to one or more antennas (not shown) for receiving satellite signals. The GPS receiver 450 may comprise any suitable hardware and/or software for receiving and processing GPS signals. The GPS receiver 450 requests information and operations as appropriate from the other systems, and performs the calculations necessary to determine the vehicle's 300 position using measurements obtained by any suitable GPS algorithm.

In an aspect, the OBC 400 may utilize the WWAN transceiver 430 and/or the WLAN transceiver 440 to download one or more maps 402 that can then be stored in memory 404 and used for vehicle navigation. Map(s) 402 may be one or more high definition (HD) maps, which may provide accuracy in the 7-10 cm absolute ranges, highly detailed inventories of all stationary physical assets related to roadways, such as road lanes, road edges, shoulders, dividers, traffic signals, signage, paint markings, poles, and other data useful for the safe navigation of roadways and intersections by vehicle 300. Map(s) 402 may also provide electronic horizon predictive awareness, which enables the vehicle 300 to know what lies ahead.

In an aspect, the camera 412 may capture image frames (also referred to herein as camera frames) of the scene within the viewing area of the camera 412 (as illustrated in FIG. 3 as horizontal coverage zone 360) at some periodic rate. Likewise, the radar 414 may capture radar frames of the scene within the viewing area of the radar 414 (as illustrated in FIG. 3 as horizontal coverage zone 350) at some periodic rate. The periodic rates at which the camera 412 and the radar 414 capture their respective frames may be the same or different. Each camera and radar frame may be time-stamped. Thus, where the periodic rates are different, the timestamps can be used to select simultaneously, or nearly simultaneously, captured camera and radar frames for further processing (e.g., fusion).

Figure 5:
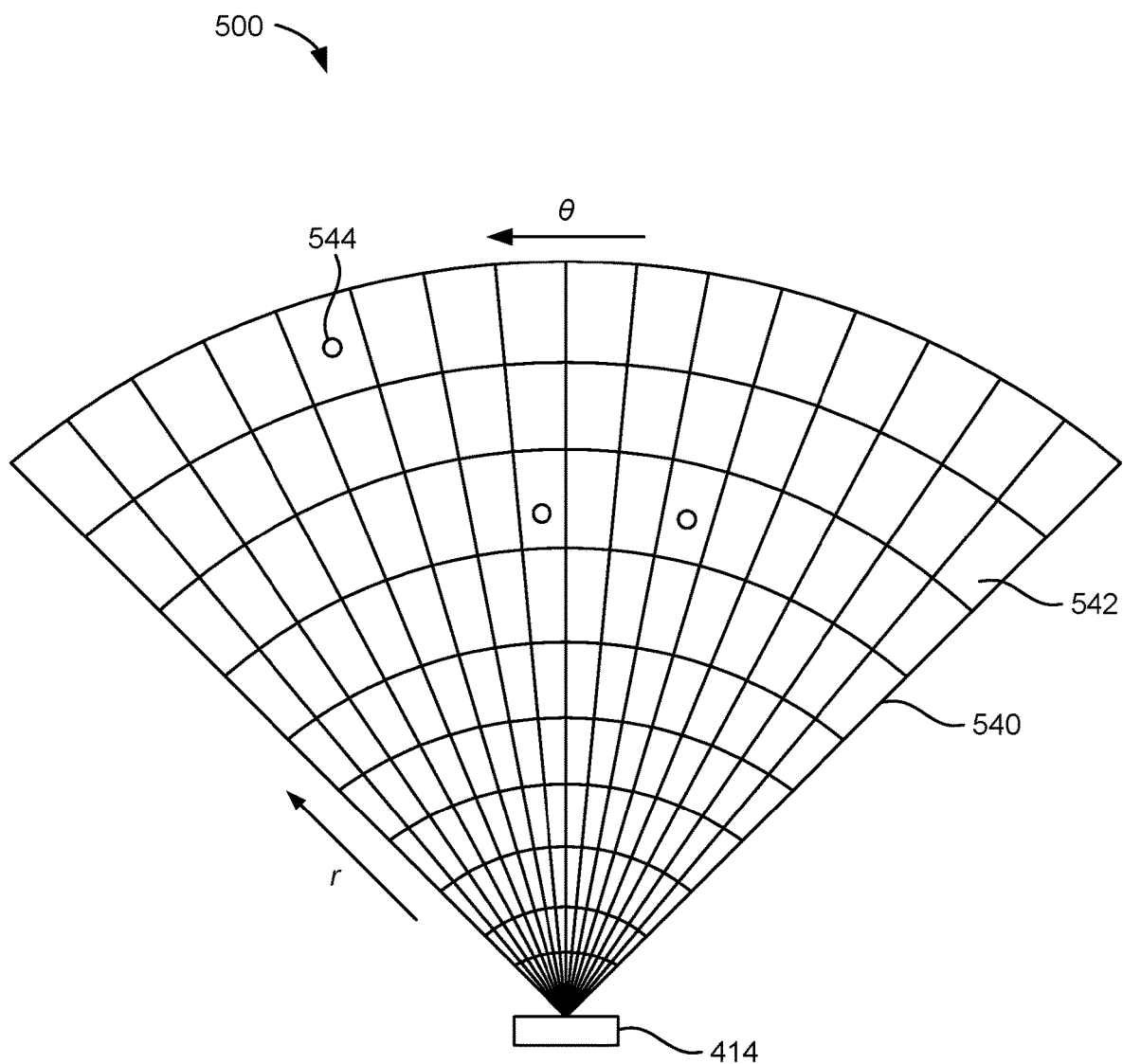
FIG. 5 is a schematic of a sensed occupancy radar grid, according to various aspects of the disclosure.

FIG. 5 illustrates a sensed observation radar grid 500. A transmitter (e.g., an array of transmit antennas) of the radar 414 transmits pulses of electromagnetic RF waves that reflect from object(s) in the transmission path, such as vehicles 330 and 340 in FIG. 3. A portion of the electromagnetic RF waves that are reflected from the object(s) are returned to the receiver (e.g., an array of receive antennas) of the radar 414, which is usually located at the same site as the transmitter of the radar 414.

In an aspect, the radar 414 may be an imaging radar that uses beamforming to scan horizontally and vertically. Beamforming is a technique used to aim the effective direction of a radar beam by changing the delay between different transmitting antennas so that the signals add constructively in a specified direction. Thus, the radar 414 may scan horizontally and vertically across the sensing area (e.g., horizontal coverage zone 350) by using a transmitter comprising an array of electronically steered antennas.

The returned responses (which may also be referred to as "pings") measured by the radar 414 is characterized as an observation (or occupancy) grid 540 having a plurality of observation cells 542. Each cell 542 represents the measured returned response value at a specific range (r) and angle/azimuth (θ). Each cell 542 is alternately referred to as a range-angle bin. Features 544 are extracted from the cells 542 to determine whether the feature 544 is an object (e.g., a vehicle 330/340). Each feature 544 within a respective cell 542 can be identified as having up to four parameters: range, Doppler, azimuth, and elevation. This is called a radar frame. As an example, a feature 544 within a cell 542 may be the signal-to-noise ratio (SNR) computed by a constant false alarm rate (CFAR) algorithm. However, it should be understood that other methods may be used to target and identify features 544 within a cell 542.

The processor(s) 406 may generate two-dimensional (2D), three-dimensional (3D), or four dimensional (4D) tensors for features 544 within cells 542 of the observation grid 540 detected by the radar 414. Specifically, a 2D tensor represents the range (distance from the vehicle 300 to the detected feature 544) and azimuth (the horizontal distance between a feature 544 and a reference RF ray emitted by the radar 414, such as the initial RF ray of a radar sweep) of each detected feature 544. A 3D tensor represents the range, azimuth, and Doppler (indicating the speed of the detected feature 544) or elevation (vertical direction from the radar 414 to the detected feature) of each detected feature 544. A 4D tensor represents all four quantities. The processor(s) 406 then performs object detection, object classification, localization, and property/attribute estimation based on the tensors and undistorted camera frames received from the camera 412.

As more and more vehicles become autonomous or semi-autonomous, there will be more and more radar sources (e.g., radar 414) that will need to coexist with each other. However, multiple radar sources may lead to significant interference, which is particularly problematic for accurate target detection. Conventional radar waveforms may be indistinguishable, even when transmitted from different sources. As such, other radar sources appear to an ego vehicle (e.g., vehicle 300) as "ghost" targets (i.e., detected objects that do not correspond to physical target objects). In addition, high interference from a direct (interference) path may be much stronger than the signal strength of a reflected (desired) path ($R^2$ versus $R^4$ decay). This is described below with reference to FIGS. 6A and 6B.

Frequency-modulated continuous-wave (FMCW) radar is a type of conventional radar that suffers from the above drawbacks. FMCW radar is a short-range measuring radar capable of providing distance measurements to a target object along with speed measurements of the target object. FMCW uses a transmitted signal of a known stable frequency continuous wave that varies in frequency over a fixed period of time by a modulating signal. The frequency difference between the received (reflected) signal and the transmitted signal increases with delay, and hence with distance. This smears out, or blurs, the Doppler signal. Echoes from a target object are then mixed with the transmitted signal to produce a beat signal, which provides the distance to the target object after demodulation.

Figure 6A:
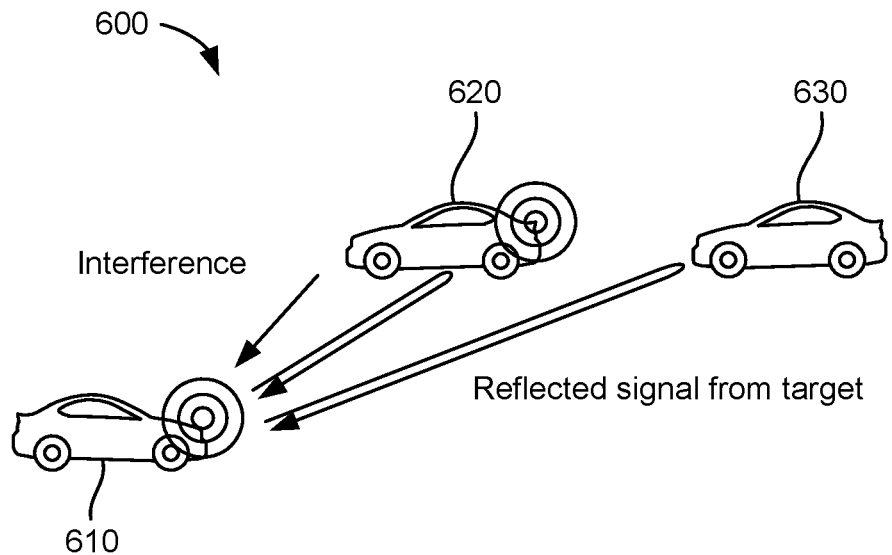
FIG. 6A is a diagram illustrating an example of an ego vehicle and two target vehicles, according to various aspects of the disclosure.

FIG. 6A is a diagram 600 illustrating an example of an ego vehicle 610 and two target vehicles 620 and 630, according to various aspects of the disclosure. In the example of FIG. 6A, both the ego vehicle 610 and the target vehicle 620 are equipped with radar sensors (e.g., radar 414), and may therefore be examples of vehicle 300. The target vehicle 630 may not be equipped with a radar sensor, and may therefore be an example of vehicle 330 or 340. As shown in FIG. 6A, the ego vehicle 610 detects both target vehicles 620 and 630 with its radar sensor, as illustrated by the round-trip lines labeled "reflected signal from target." However, because the target vehicle 620 is also a radar source, the ego vehicle 610 receives a radar signal directly from the target vehicle 620, as illustrated by the black arrow labeled "interference." This may cause the ego vehicle 610 to determine that there is a third target vehicle (a "ghost" target) at half the distance to the actual target vehicle 620 (because the ego vehicle 610 interprets the radar signal received from the target vehicle 620 as having traveled from the ego vehicle 610 to the ghost target and back in the time it actually took the received signal to travel from the target vehicle 620 to the ego vehicle 610). To prevent such a misdetection, the ego vehicle 610 can increase the noise floor (a signal strength threshold under which an ego vehicle will ignore reflections) to eliminate the detection of ghost targets. However, as illustrated in FIG. 6B, this can potentially result in not detecting real targets.

Figure 6B:
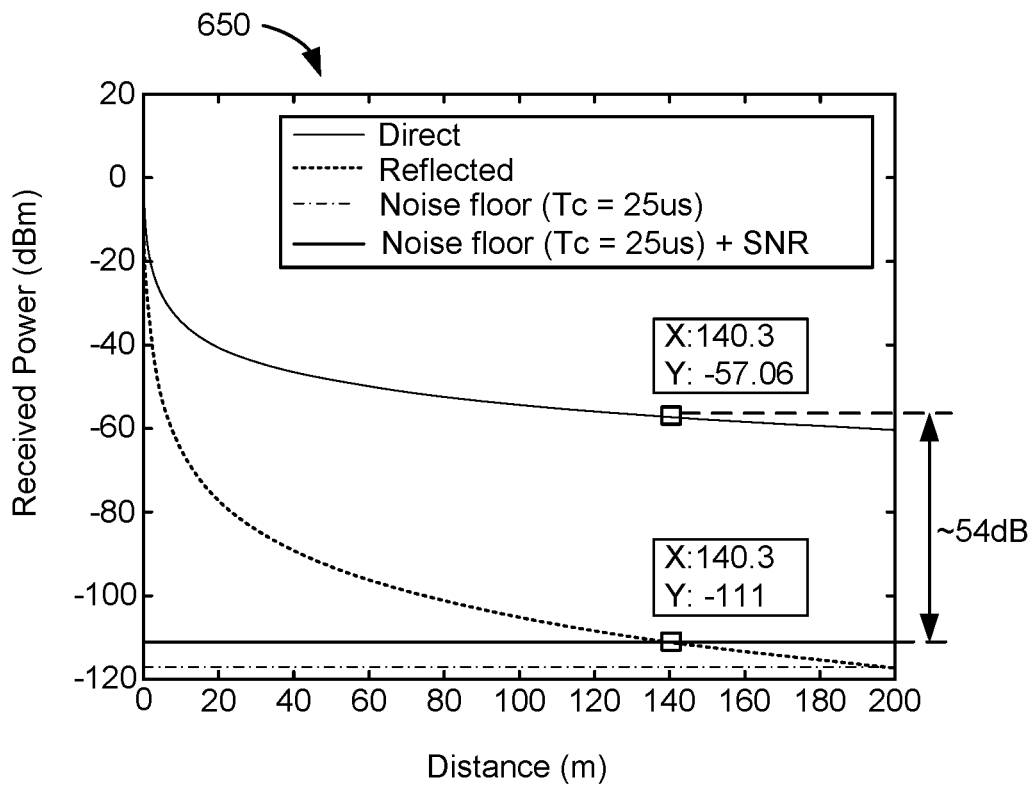
FIG. 6B is a graph illustrating an example of how much higher the received power of a direct radar signal can be when compared to the received power of a reflected radar signal.

FIG. 6B is a graph 650 illustrating an example of how much higher the received power of a direct radar signal can be compared to the received power of a reflected radar signal. For example, with reference to FIG. 6A, if the target vehicle 620 is 140.3 meters (m) from the ego vehicle 610, the received power of the radar signal received directly from the target vehicle 620 may be −57.06 decibel-milliwatts (dBm), while the received power of the reflected radar signal (i.e., the reflection of the radar signal transmitted by the ego vehicle 610) may be −111 dBm. If the ego vehicle 610 increases the noise floor (illustrated as $T_c$=25 µs or $T_c$=25 µs plus the SNR) to eliminate the detection of the radar signal following the direct path, it will also eliminate the detection of the radar signal following the reflected path.

Figure 7A:
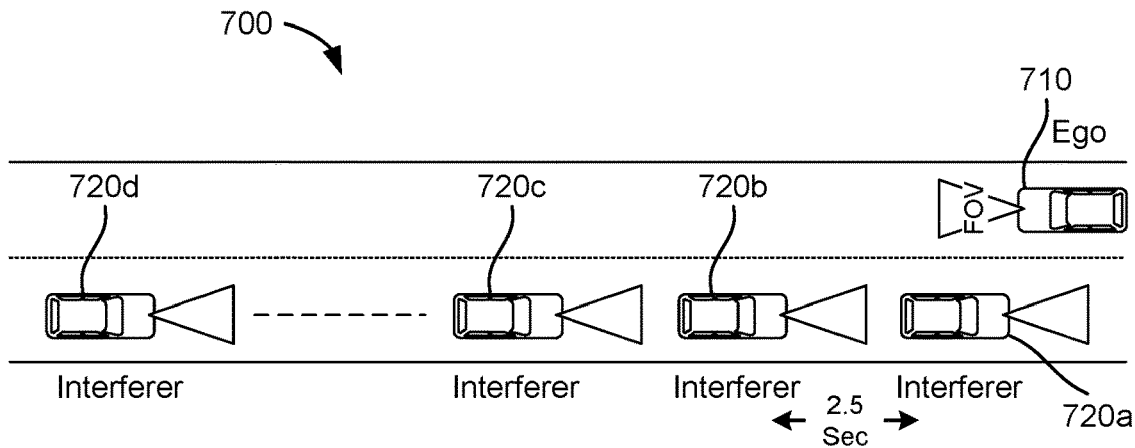
FIG. 7A is a diagram illustrating an example of an ego vehicle and a number of interfering target vehicles, according to various aspects of the disclosure.
Figure 7B:
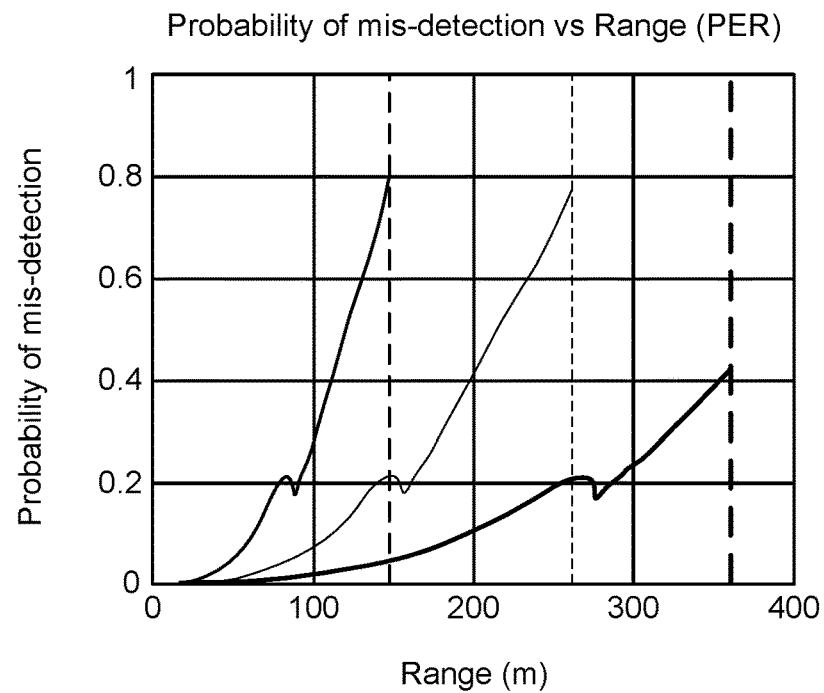
FIG. 7B is a graph illustrating an example of the probability of misdetection at different ranges.

FIGS. 7A and 7B illustrate examples of the impact on radar performance due to multi-radar interference. FIG. 7A is a diagram 700 illustrating an example of an ego vehicle 710 and a number of target vehicles 720*a-d* (collectively, target vehicles 720), similar to a National Highway Traffic Safety Administration (NHTSA) scenario. In the example of FIG. 7A, each target vehicle 720*a-d* is also a radar source and therefore an interferer. Thus, each vehicle illustrated in FIG. 7A may be an example of vehicle 300.

FIG. 7B is a graph 750 illustrating an example of the probability of target misdetection at different ranges (in meters). The graph 750 shows the misdetection results of a scenario similar to the scenario in FIG. 7A, except that there are 23 interference sources in the opposite lane of traffic. That is, in the scenario illustrated in FIG. 7B, there are 23 interfering vehicles 720 approaching the ego vehicle 710 in the opposite lane instead of only the four illustrated in FIG. 7A. In addition, note that pedestrians generally have a radar cross section (RCS) of approximately 0 decibels (dB), cars have an RCS of approximately 10 dB, and trucks have an RCS of approximately 20 dB.

In graph 750, the vertical dashed lines show the ranges at which the ego vehicle (e.g., ego vehicle 710) could detect the given type of target (i.e., pedestrian, car, truck) if there were no interference. The solid curved lines show the probability of a misdetection at different ranges in the presence of interference. As shown in graph 750, at a 10% probability of misdetection, there is approximately a 43% to 53% loss in radar detection range. This loss of range would be even higher if a higher reliability (lower misdetection) were needed.

Figure 8:
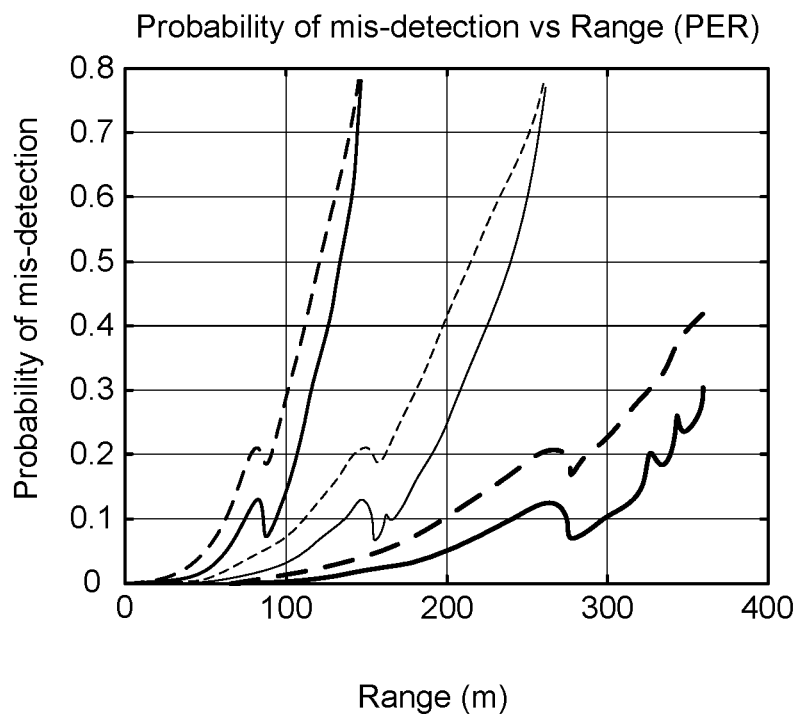
FIG. 8 is a graph illustrating an example of the probability of misdetection at different ranges.

Coordinated selection of FMCW parameters among radar sources (e.g., autonomous vehicles) can significantly improve target (mis)detection performance. For example, the choice of radar parameters such as time, slope, and frequency offset can minimize mutual interference. FIG. 8 is a graph 800 illustrating an example of the probability of misdetection at different ranges (in meters). The graph 800 shows the misdetection results of a scenario similar to the scenario in FIG. 7B, where there are 23 interferers in the opposite lane of travel to the ego vehicle. That is, the test scenario is similar to the scenario illustrated in FIG. 7A, except that there are 23 interfering vehicles 720 approaching the ego vehicle 710 in the opposite lane instead of only the four illustrated in FIG. 7A.

In graph 800, the curved dashed lines show the probability of a misdetection at different ranges in the presence of interference when there is no coordination among radar sources (i.e., no coordination of radar parameters). These curves correspond to the curves shown in graph 750 in FIG. 7B, and, as in FIG. 7B, illustrate the probability of a misdetection for different types of targets (i.e., pedestrian, car, truck). The solid curved lines show the probability of a misdetection at different ranges when there is coordination (i.e., coordination of radar parameters). As shown in graph 800, at a 10% probability of misdetection, there is approximately a 50% increase in detection range for pedestrians and cars and approximately a 20% increase in detection range for trucks.

Given the benefits of coordinating radar parameters among radar sources (e.g., autonomous vehicles), the present disclosure provides techniques for enabling such coordination. To coordinate the selection of radar parameters by different vehicles, the vehicles need to be able to communicate among themselves to negotiate the radar parameters. However, not all radar sources in proximity to each other may interfere with each other, depending on the frequency band, parameters, etc. being used. As such, a reactive communication and coordination would be beneficial, where only certain vehicles need to communicate with each other if their current radar transmissions are significantly affecting ego-radar performance. An issue, however, is identifying a vehicle by observing its radar transmissions alone.

Accordingly, the present disclosure provides techniques to embed information data bits, such as a vehicle identifier (ID) (e.g., license plate number, vehicle identification number (VIN), UE ID, etc.), in radar transmissions (e.g., FMCW radar transmissions) that can be estimated/determined at the receiving radar sensor (e.g., radar 414). The determined vehicle ID can then be used to establish a communication with the interfering vehicle on a different channel (e.g., using V2X communications).

In an aspect, a radar (e.g., radar 414) can encode information data bits and embed them as a phase code over FMCW. The information data bits may be a vehicle ID that can be used to address the transmitting vehicle in an attempt to establish a connection with it. The information data bits may be encoded (e.g., polar encoded or low-density parity check (LDPC) encoded) and a cyclic redundancy check (CRC) may be attached.

For example, assume a set of coded bits is represented as $\{c_0, c_1, \ldots c_N\}$. In an aspect, the number of coded bits to be transmitted (i.e., N) may be determined as a function of the number of chirps, the number of known reference symbols, and the phase-shift keying (PSK) modulation order (i.e., PSK, binary phase-shift keying (BPSK), quadrature phase-shift keying (QPSK), 8-PSK, etc.). For example, if the number of chirps is represented as Nc, the number of chirps with known phase modulation is represented as Nc1, and the PSK modulation order (i.e., 1, 2, 4, 8, etc.) is represented as Q, then the number of coded bits that can be transmitted can be determined as N=(Nc-Nc1)*Q.

PSK modulated phase-code symbols $s=\{s_1, s_2, \ldots s_{(Nc-Nc1)}\}$ can then be generated to convey the information data bits. For example, for a QPSK modulation, $s_k=\exp(\pm 1i*\pi/4)$ or $\exp(\pm 1i*3*\pi/4)$ based on $\{c_{k/2}, c_{k/2+1}\}$. In addition, PSK modulated symbols $d=\{d_1, d_2, \ldots d_{(Nc1)}\}$ can be generated as the known phase reference symbols known to the other vehicles.

Note that PSK is a digital modulation process that conveys data by changing (modulating) the phase of a constant frequency reference signal (the carrier wave). Each of a finite number of phases (e.g., 2, 4, 8) represents a particular symbol. For example, BPSK uses two phases that can represent two symbols, QPSK uses four phases that can represent four symbols, and 8-PSK uses eight phases that can represent eight symbols. The demodulator (receiver) determines the phase of the received signal and maps it back to the symbol it represents, thus recovering the original data.

An FMCW waveform can be phase-coded according to (e.g., based on) the phase-coded symbols s and d described above. For example, assume the following parameters:

$K=Nc/Nc_1$

Set of chirps=$\{1:Nc\}$

Subset 1=$\{1:K:Nc\}$

Subset 2=Set of chirps minus Subset 1

For the Subset 1 chirps, the FMCW waveform can be phase-modulated using $d_k$, where $d_k$ are known to the other vehicles and are used as reference symbols. For the Subset 2 chirps, the FMCW waveform can be phase-modulated using $s_k$. The reason for using reference symbols even though the chirps are phase coherent is that phase-locked loop (PLL) phase noise variations between the ego vehicle and the interferer vehicle(s) will introduce phase variations across chirps (variations within a chirp are small). These phase variations need to be estimated, which can be accomplished using the reference symbols. In general, the transmitter vehicle can interleave known phases (the reference symbols) every K-chirps (e.g., K=2). The use of these reference symbols is similar to the use of phase tracking reference signals (PTRS) for the 5G NR Uu interface (the air interface between the UE and the gNB) for phase tracking. The radar (e.g., radar 414) of a transmitter vehicle (e.g., ego vehicle 610, target vehicle 620) can then transmit Nc chirps of the phase-modulated FMCW waveform as its radar signal.

As a specific example, if Nc=128, meaning there are 128 chirps, or 128 bits, per radar transmission and K=2, then 64 chirps would be used as reference symbols (the "Subset 1" chirps), leaving 64 chirps to be used for information data bits (the "Subset 2" chirps), such as a vehicle ID.

At the receiver side (e.g., a target vehicle 620, or the ego vehicle 610 when receiving a radar signal from the target vehicle 620), the receiving radar receives the radar signal transmitted by another radar source by tuning to the FMCW parameters used by the other radar source. In an aspect, the set of potential FMCW parameters that a given radar can use may be preconfigured in the radar (e.g., based on the applicable wireless communication standard). As such, when a radar experiences interference from another vehicle, it can tune to different preconfigured FMCW parameters until it can decode the received radar signal.

The receiving radar can determine the random phase difference between the receiving radar and the transmitting (interfering) radar using the observed phase of the subset of chirps carrying reference symbols (e.g., the "Subset 1" chirps). The receiving radar can equalize the determined phase difference for the Subset 1 chirps using the determined random phase difference. The receiving radar can then determine the Doppler and the phase code on the subset of chirps carrying the information data bits (e.g., the "Subset 2" chirps) and decode and determine the information data bits (e.g., the vehicle ID). Where the information bits indicate the ID of the transmitting vehicle, the receiving vehicle can communicate with the other vehicle (i.e., the transmitting/interfering vehicle) using the determined vehicle ID. Specifically, the receiving vehicle can attempt to establish a vehicle-to-vehicle (V2V) or V2X communication session (e.g., sidelink) with the transmitting (interfering) vehicle.

Figure 9A:
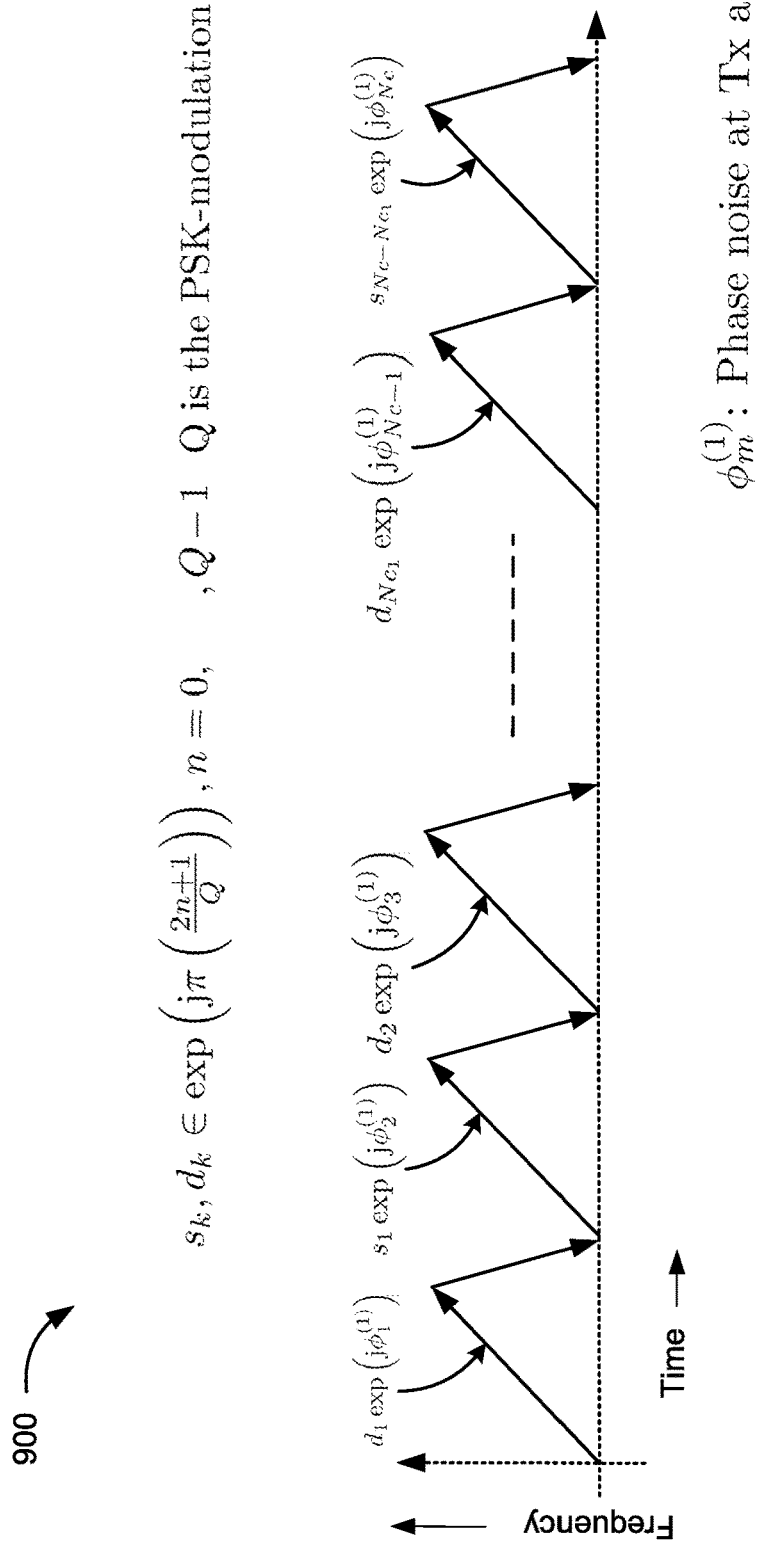
FIG. 9A is a diagram illustrating an example of a transmitter side phase-coded frequency-modulated continuous-wave (FMCW) waveform, according to various aspects of the disclosure.
Figure 9B:
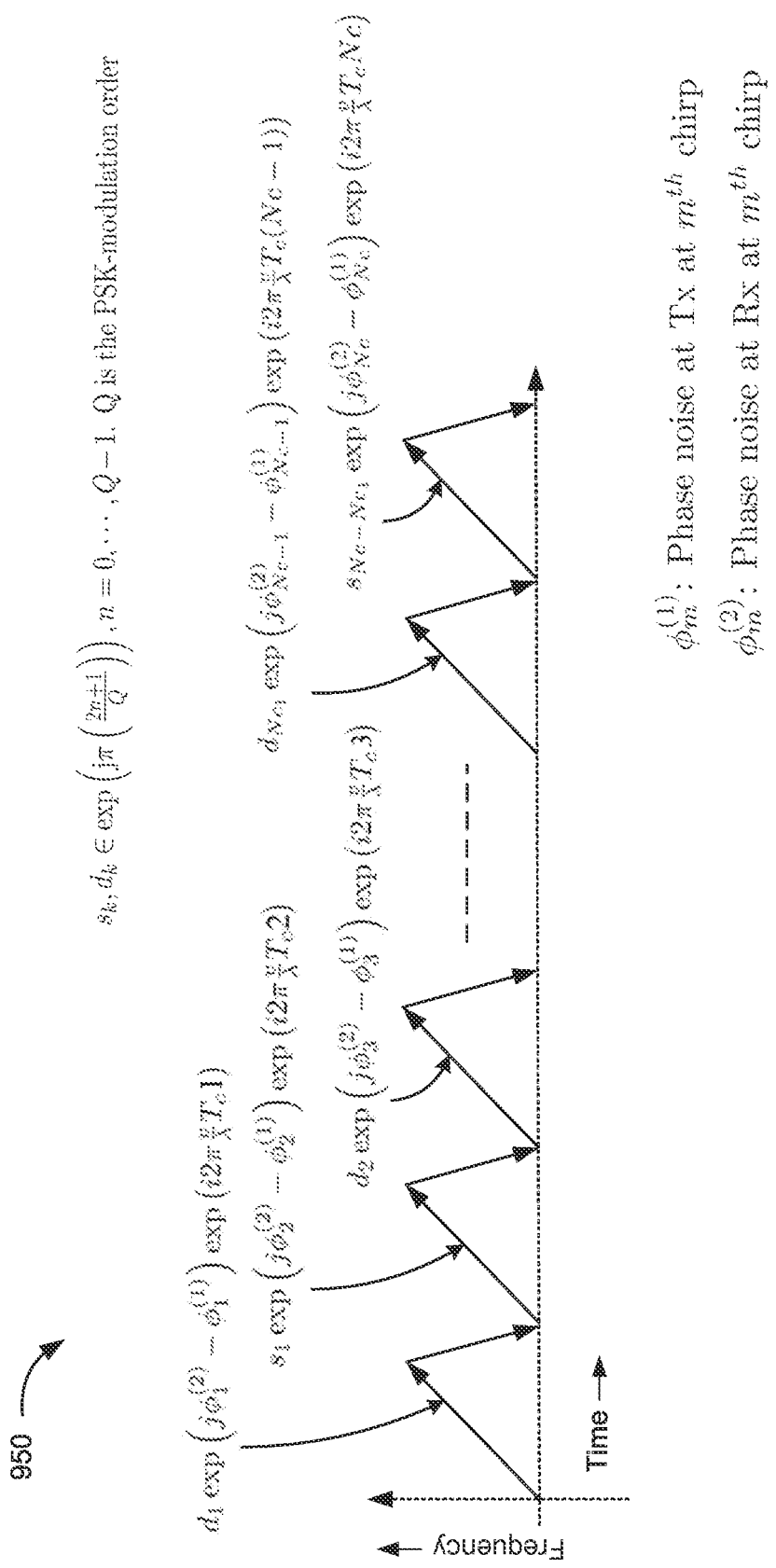
FIG. 9B is a diagram illustrating an example of a receiver side phase-coded FMCW waveform, according to various aspects of the disclosure.

FIG. 9A is a diagram of an example of a transmitter side phase-coded phase-modulated continuous-wave (PMCW) waveform 900, according to various aspects of the disclosure. FIG. 9B is a diagram of an example of a receiver side phase-coded PMCW waveform 950, according to various aspects of the disclosure. In FIGS. 9A and 9B, Q is the PSK modulation order (e.g., 2, 4, 8), i and j represent the square root of −1, lambda ($\lambda$) is the wavelength, $d_k$ is a reference chirp/symbol (e.g., a "Subset 1" chirp), $s_k$ is a chirp/symbol conveying an information data bit (e.g., a "Subset 2" chirp), and Tc is the noise floor (threshold). For $d_k$, k is an index from 1 to Nc-Nc1, where Nc is the total number of chirps and Nc1 is the number of chirps with known phase modulation. For $s_k$, k is an index from 1 to Nc1. In FIG. 9A, $\emptyset_m^{(1)}$ is the phase noise at the transmitter (Tx) at the $m^{th}$ chirp. In FIG. 9B, $\emptyset_m^{(2)}$ is the phase noise at the receiver (Rx) at the $m^{th}$ chirp.

Figure 10:
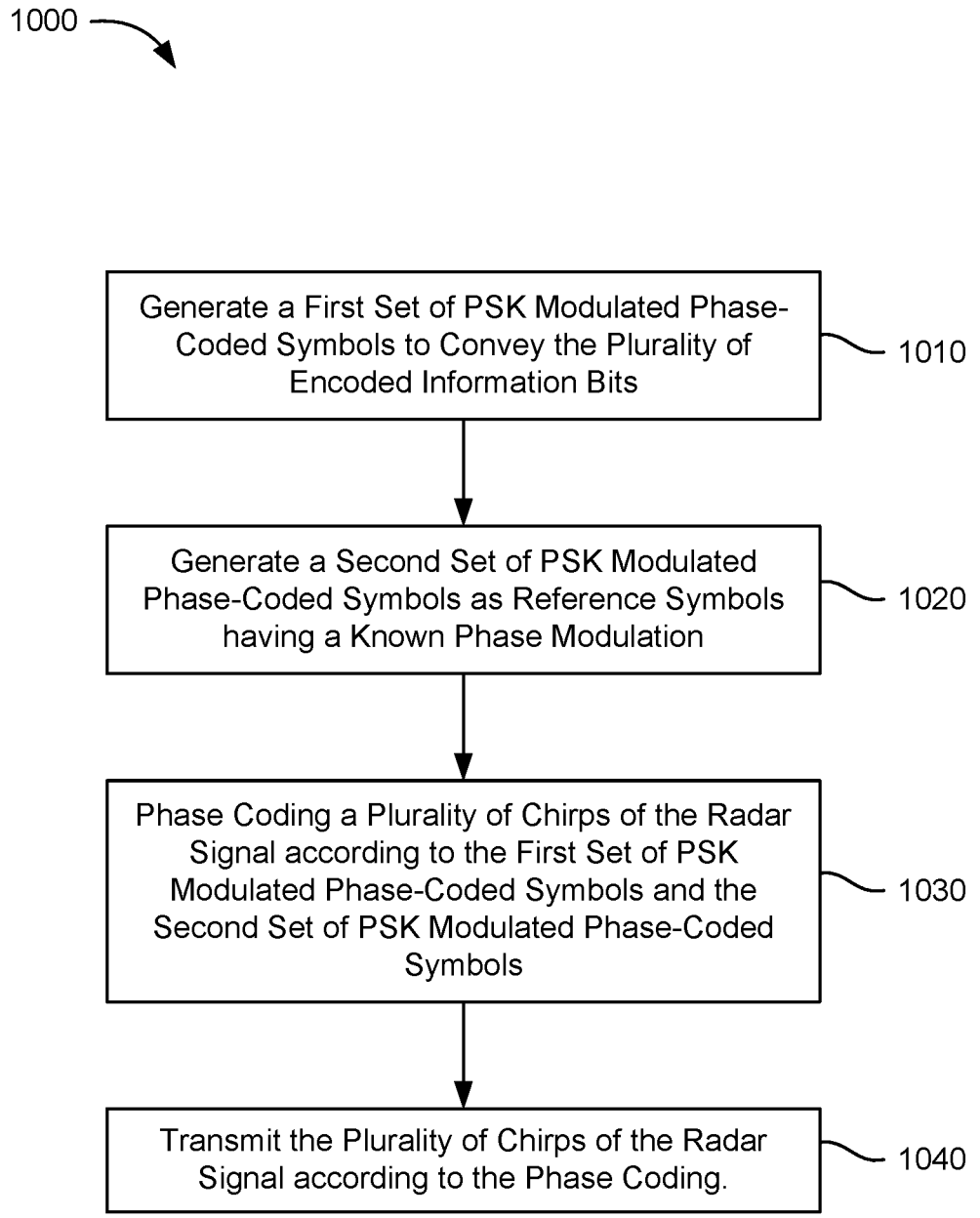
FIGS. 10 and 11 illustrate example methods according to various aspects of the disclosure.

FIG. 10 illustrates an example method 1000 of transmitting a plurality of encoded information bits on a radar signal. The method 1000 may be performed by a transmitter radar, such as radar 414. In an aspect, the radar 414 may be considered means for performing each operation of method 1000.

At 1010, the radar 414 generates a first set of PSK modulated phase-coded symbols to convey the plurality of encoded information bits.

At 1020, the radar 414 generates a second set of PSK modulated phase-coded symbols as reference symbols having a known phase modulation.

At 1030, the radar 414 phase codes a plurality of chirps of the radar signal according to the first set of PSK modulated phase-coded symbols and the second set of PSK modulated phase-coded symbols, as described above with reference to FIGS. 9A and 9B. For example, a portion of the plurality of chirps may be phase coded according to the first set, and the remaining chirps of the plurality of chirps may be phase coded according to the second set.

At 1040, the radar 414 transmits the plurality of chirps of the radar signal according to the phase coding.

Figure 11:
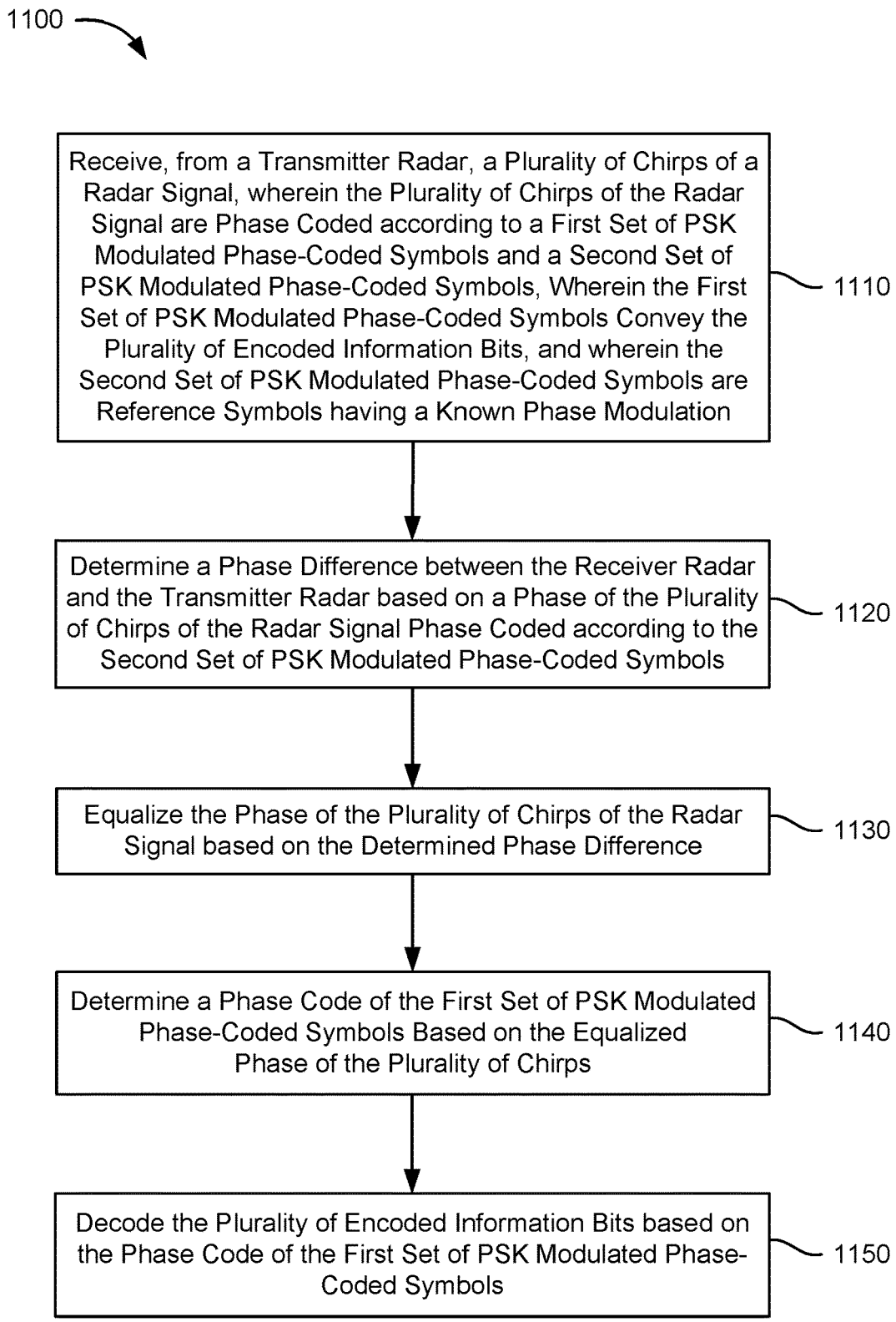

FIG. 11 illustrates an example method 1100 of receiving a plurality of encoded information bits on a radar signal. The method 1100 may be performed by a receiver radar, such as radar 414. In an aspect, the radar 414 may be considered means for performing each operation of method 1100.

At 1110, the radar 414 receives, from a transmitter radar, a plurality of chirps of the radar signal, wherein the plurality of chirps of the radar signal are phase coded according to a first set of PSK modulated phase-coded symbols and a second set of PSK modulated phase-coded symbols, wherein the first set of PSK modulated phase-coded symbols convey the plurality of encoded information bits, and wherein the second set of PSK modulated phase-coded symbols are reference symbols having a known phase modulation;

At 1120, the radar 414 determines a phase difference between the receiver radar and the transmitter radar based on a phase of the plurality of chirps of the radar signal phase coded according to the second set of PSK modulated phase-coded symbols.

At 1130, the radar 414 equalizes the phase of the plurality of chirps of the radar signal based on the determined phase difference.

At 1140, the radar 414 determines a phase code of the first set of PSK modulated phase-coded symbols based on the equalized phase of the plurality of chirps.

At 1150, the radar 414 decodes the plurality of encoded information bits based on the phase code of the first set of PSK modulated phase-coded symbols.

As will be appreciated, a technical advantage of the methods 1000 and 1100 is that a transmitter radar can encode information (e.g., vehicle ID) in its radar signal, and a receiver radar can decode that information. This enables the transmitter and receiver to coordinate subsequent communications with each other to, for example, establish a sidelink, coordinate radar parameters, and thereby reduce interference with each other.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner.

Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims.

Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. An apparatus, comprising:
  a receiver radar configured to:
    receive, from a transmitter radar, a plurality of chirps of a radar signal, wherein the plurality of chirps of the radar signal are phase coded according to a first set of phase-shift keying (PSK) modulated phase-coded symbols and a second set of PSK modulated phase-coded symbols, wherein the first set of PSK modulated phase-coded symbols convey a plurality of encoded information bits, and wherein the second set of PSK modulated phase-coded symbols are reference symbols having a known phase modulation;

determine a phase difference between the receiver radar and the transmitter radar based on a phase of the plurality of chirps of the radar signal phase coded according to the second set of PSK modulated phase-coded symbols;

equalize the phase of the plurality of chirps of the radar signal based on the determined phase difference;

determine a phase code of the first set of PSK modulated phase-coded symbols based on the equalized phase of the plurality of chirps; and decode the plurality of encoded information bits based on the phase code of the first set of PSK modulated phase-coded symbols.

2. The apparatus of claim 1, wherein a number of PSK modulated phase-coded symbols in the first set is equal to a number of the plurality of chirps of the radar signal minus a number of PSK modulated phase-coded symbols in the second set.

3. The apparatus of claim 1, wherein a number of the plurality of encoded information bits is represented as (Nc−Nc1)*Q, wherein Nc is a number of the plurality of chirps of the radar signal, Nc1 is a number of PSK modulated phase-coded symbols in the second set, and Q is a PSK modulation order.

4. The apparatus of claim 1, wherein:

a first set of chirps in the plurality of chirps of the radar signal are phase coded according to the first set of PSK modulated phase-coded symbols; and a second set of chirps in the plurality of chirps of the radar signal are phase coded according to the second set of PSK modulated phase-coded symbols.

5. The apparatus of claim 4, wherein the first set of chirps in the plurality of chirps of the radar signal are interleaved with the second set of chirps in the plurality of chirps of the radar signal.

6. The apparatus of claim 4, wherein the first set of chirps in the plurality of chirps of the radar signal are phase coded according to $s_k \exp(j\emptyset_m^{(2)} - \emptyset_m^{(1)})$, where $s_k$ is a k-th symbol of the first set of PSK modulated phase-coded symbols to be modulated to a m-th chirp of the plurality of chirps, j represents the square root of −1, $\emptyset_m^{(2)}$ is phase noise of the m-th chirp at the receiver radar, and $\emptyset_m^{(1)}$ is phase noise of the m-th chirp at the transmitter radar.

7. The apparatus of claim 4, wherein the second set of chirps in the plurality of chirps of the radar signal are phase coded according to $d_k \exp(j\emptyset_m^{(2)} - \emptyset_m^{(1)})$, where $d_k$ is a k-th symbol of the second set of PSK modulated phase-coded symbols to be modulated to a m-th chirp of the plurality of chirps, j represents the square root of −1, $\emptyset_m^{(2)}$ is phase noise of the m-th chirp at the receiver radar, and $\emptyset_m^{(1)}$ is phase noise of the m-th chirp at the transmitter radar.

8. The apparatus of claim 1, wherein the radar signal is received from a radar of an autonomous or semi-autonomous vehicle.

9. The apparatus of claim 8, wherein the plurality of encoded information bits comprises an identifier of the autonomous or semi-autonomous vehicle.

10. The apparatus of claim 9, wherein the identifier comprises a license plate number of the autonomous or semi-autonomous vehicle, a vehicle identification number (VIN) of the autonomous or semi-autonomous vehicle, or a user equipment (UE) identifier associated with the autonomous or semi-autonomous vehicle.

11. The apparatus of claim 9, further comprising:

a transceiver configured to establish a sidelink with the autonomous or semi-autonomous vehicle based on the identifier to coordinate radar transmissions between the autonomous or semi-autonomous vehicle and the receiver radar.

12. The apparatus of claim 1, wherein the receiver radar comprises a radar of an autonomous or semi-autonomous vehicle.

13. The apparatus of claim 1, wherein the receiver radar is further configured to:

determine a Doppler of the first set of PSK modulated phase-coded symbols based on the equalized phase of the plurality of chirps of the radar signal.

14. A method of receiving a plurality of encoded information bits on a radar signal performed by a receiver radar, comprising:

receiving, from a transmitter radar, a plurality of chirps of the radar signal, wherein the plurality of chirps of the radar signal are phase coded according to a first set of phase-shift keying (PSK) modulated phase-coded symbols and a second set of PSK modulated phase-coded symbols, wherein the first set of PSK modulated phase-coded symbols convey the plurality of encoded information bits, and wherein the second set of PSK modulated phase-coded symbols are reference symbols having a known phase modulation;

determining a phase difference between the receiver radar and the transmitter radar based on a phase of the plurality of chirps of the radar signal phase coded according to the second set of PSK modulated phase-coded symbols;

equalizing the phase of the plurality of chirps of the radar signal based on the determined phase difference;

determining a phase code of the first set of PSK modulated phase-coded symbols based on the equalized phase of the plurality of chirps; and decoding the plurality of encoded information bits based on the phase code of the first set of PSK modulated phase-coded symbols.

15. The method of claim 14, wherein a number of the plurality of encoded information bits is represented as (Nc−Nc1)*Q, wherein Nc is a number of the plurality of chirps of the radar signal, Nc1 is a number of PSK modulated phase-coded symbols in the second set, and Q is a PSK modulation order.

16. The method of claim 14, wherein:

a first set of chirps in the plurality of chirps of the radar signal are phase coded according to the first set of PSK modulated phase-coded symbols; and a second set of chirps in the plurality of chirps of the radar signal are phase coded according to the second set of PSK modulated phase-coded symbols.

17. The method of claim 16, wherein the first set of chirps in the plurality of chirps of the radar signal are interleaved with the second set of chirps in the plurality of chirps of the radar signal.

18. The method of claim 16, wherein the first set of chirps in the plurality of chirps of the radar signal are phase coded according to $s\_k \exp([(j\emptyset)]\_m^{(2)} - \emptyset\_m^{(1)})$, where sk is a k-th symbol of the first set of PSK modulated phase-coded symbols to be modulated to a m-th chirp of the plurality of chirps, j represents the square root of −1, $\emptyset\_m^{(2)}$ is phase noise of the m-th chirp at the receiver radar, and $0\_m^{(1)}$ is phase noise of the m-th chirp at the transmitter radar.

19. The method of claim 16, wherein the second set of chirps in the plurality of chirps of the radar signal are phase coded according to $d\_k \exp([(j\emptyset)]\_m^{(2)} - \emptyset\_m^{(1)})$, where dk is a k-th symbol of the second set of PSK modulated phase-coded symbols to be modulated to a m-th chirp of the plurality of chirps, j represents the square root of −1, $\emptyset\_m\^{((2))}$ is phase noise of the m-th chirp at the receiver radar, and $\emptyset\_m\^{((1))}$ is phase noise of the m-th chirp at the transmitter radar.

\* \* \* \* \*